Sept. 2, 1930.  B. GOULD  1,774,509
ELECTRIC MIXER
Filed March 9, 1928  2 Sheets-Sheet 1

INVENTOR.
Benjamin Gould
BY
Philip S. McKean
ATTORNEY

INVENTOR.
Benjamin Gould
BY Philip S. McJean
ATTORNEY

Patented Sept. 2, 1930

1,774,509

UNITED STATES PATENT OFFICE

BENJAMIN GOULD, OF BROOKLYN, NEW YORK

ELECTRIC MIXER

Application filed March 9, 1928. Serial No. 260,356.

The objects of the present invention are to provide simple and practical gearing for electrically operated machines for mixing and beating purposes.

Various other objects of the invention and the novel features of construction, combinations and relations of parts which enable the attainment of all such objects, will appear as the specification proceeds.

The drawings accompanying and forming part of this specification illustrate a practical commercial embodiment of the invention, but as such illustration is primarily for purposes of disclosure, it should be understood that the structure may be modified and changed without departure from the true spirit and broad scope of the invention as hereinafter defined and claimed.

Figure 1:
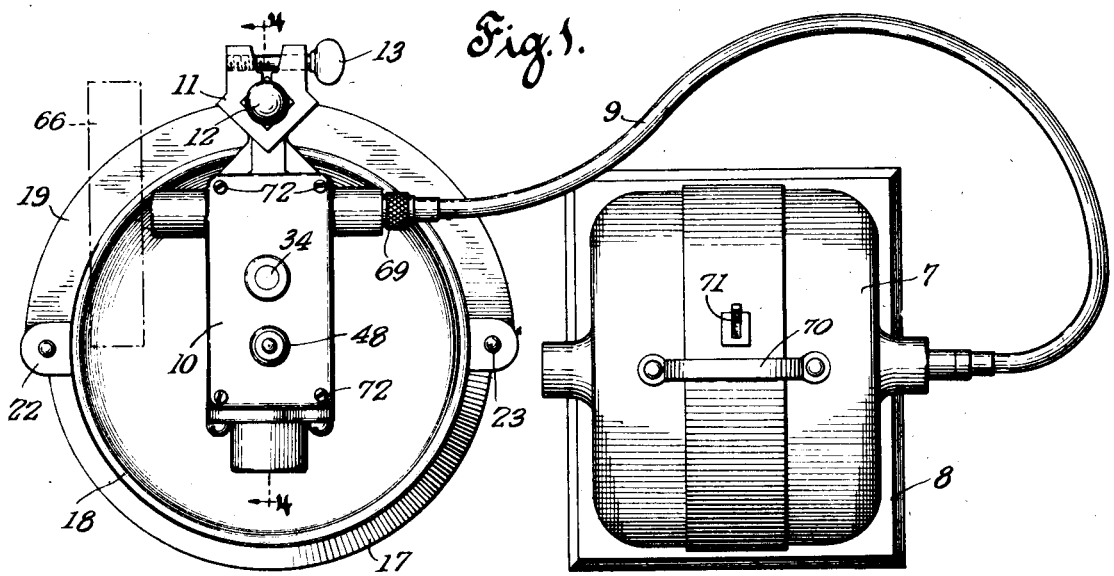
Figure 1 is a plan view of the complete apparatus.

In Figure 1, the power unit of the apparatus is illustrated as an electric motor 7, mounted on a suitable portable base 8 and connected by flexible universal drive shafting 9, with the transmission head 10 of the mixing unit.

Figures 2, 3:
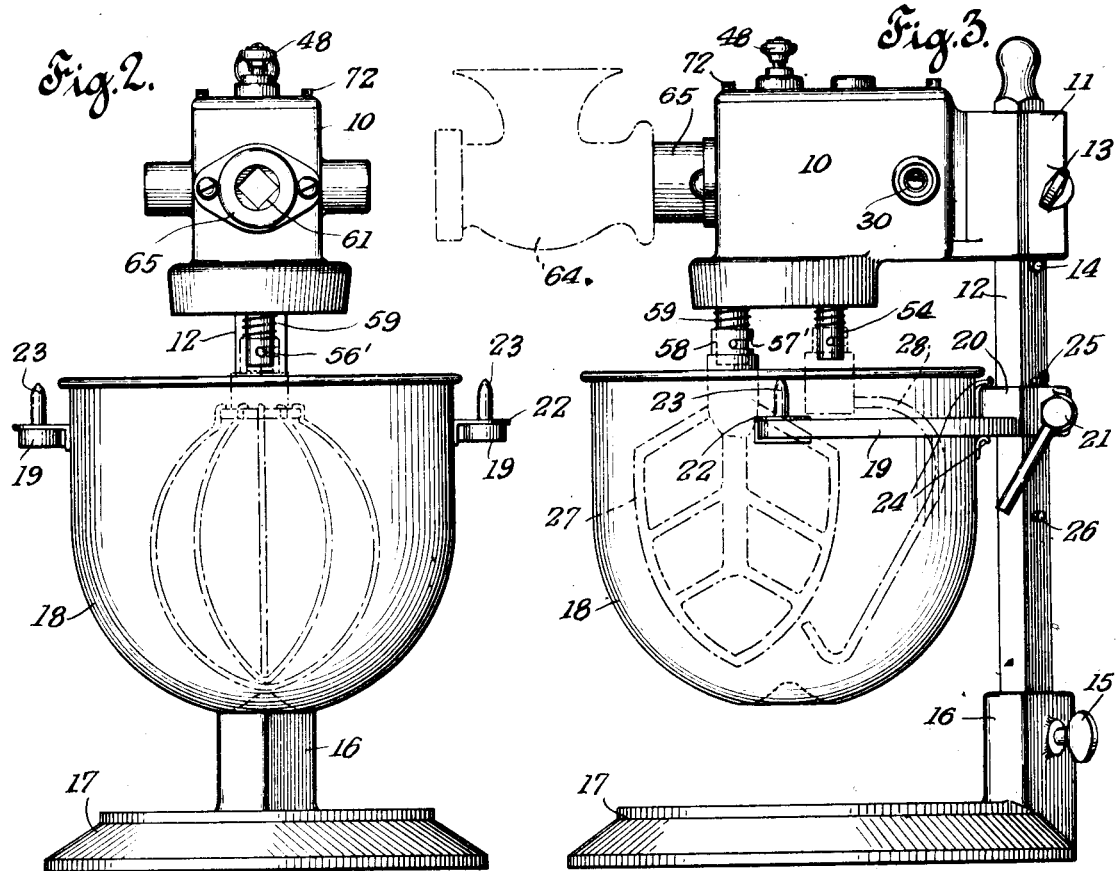
Figure 2 is a front view of the mixer unit as it appears with the motor unit uncoupled therefrom.
Figure 3 is a side view of the mixer unit, certain parts being indicated in broken lines.
Figure 4:
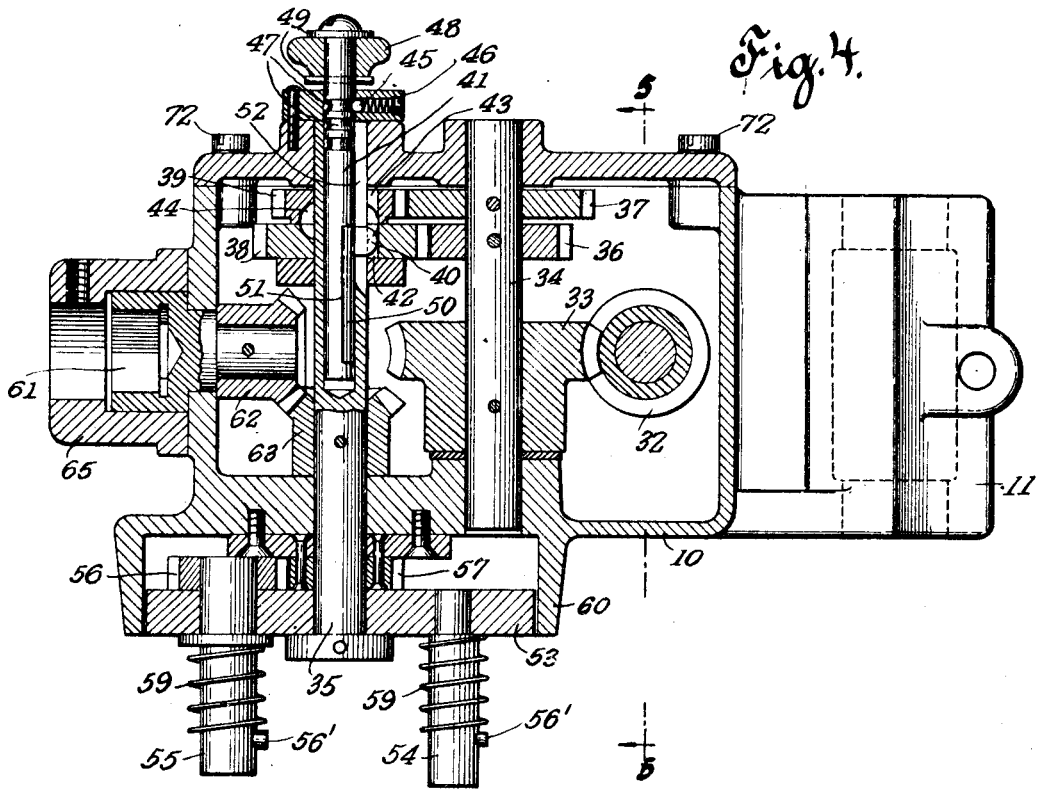
Figure 4 is a vertical sectional view of the transmission unit as on substantially the plane of line 4—4 of Figure 1.

As shown more particularly in Figures 3 and 4, the transmission head is in the form of a gear casing, having a split clamp 11 at the rear, slidably and removably engaged over a supporting post 12 of square or other angular cross section, said clamp being gripped upon the post by a clamp closing thumb screw 13. A stop pin 14 is shown on the post for limiting the downward adjustment of the transmission unit. The post is shown removably secured by thumb screw 15 in a square socket 16 on the base 17.

The mixing bowl is shown at 18 supported by a yoke 19 having a squared split sleeve 20 sliding on the post and secured by a clamp screw 21. The bowl is shown as mounted in secure, but at the same time, readily detachable relation on the yoke by having horizontal perforated ears 22 at its sides engaging over pointed pins 23 on the ends of the yoke and by having lugs or spring jaws 24 at the back, gripping over the upper and lower edges of the collar or clamp portion 20 of the yoke, Figure 3. The up and down adjustment of the yoke on the post is limited in the illustration by the stop pins 25, 26, the former being located, as indicated in Figure 3, to prevent the bowl from contacting with the beater indicated at 27, the dough hook 28 or other implements which may be used in the machine and the lower stop being positioned to support the yoke with the bowl clear of the base, in which latter position it may be readily removed from or slipped into position on the yoke.

The transmission unit comprises in the present disclosure, a horizontal shaft 29 journaled transversely in the casing 10, said shaft having a drive socket 30 in one end, receiving a corresponding coupling member 31 on the end of the flexible shafting and carrying within the casing a worm 32, meshing with a worm gear 33 on vertical shaft 34, which latter is coupled by a two-speed transmission gear set with the vertical implement operating shaft 35.

The two-speed transmission gear set is shown in the form of two gears 36, 37, of different sizes fixed on the vertical shaft 34 in mesh with complementary gears 38, 39 on the implement shaft 35 and adapted to be clutched to said shaft by a key 40 which can be shifted by rod 41 into mesh with radial slots 42, 43 in gears 38, 39 respectively. The opposing faces of these last mentioned gears are shown as having annular recesses 44 forming cooperatively an annular chamber large enough to receive the key 40, in which relations of parts, both gears will be declutched and free for rotation without driving shaft 35.

The clutching rod 41 is shown as set concentrically in the upper end of shaft 35 and as retained in either of the three positions described; that is, with the lower gear 38 clutched to the shaft 35, the intermediate neutral position with both gears declutched or with the upper gear 39 clutched to the shaft by a spring pressed ball retainer 45 mounted in a collar 46 secured on top of the casing, in position to enter the three appropriately located annular grooves 47 in the rod. The actual shifting of the rod is effected in the illustration by means of a finger button 48 loosely retained on the upper end of the rod between the shoulders 49. For assembly purposes, the key is shown formed as a lug on the upper end of a half-round piece 50 set in a corresponding recess 51 in the side of the control rod. It will be seen that when the control rod is slipped into the bore in the shaft, the loose key will be retained in position and slide up and down with the rod, the key lug projecting out through the key slot 52 cut in the side of the shaft.

In the particular construction shown, a disc 53 is fixed on the lower end of shaft 35, which disc carries an eccentric drive stem 54 for the dough hook 28 and an eccentrically rotating shaft 55, the latter having a planetary pinion 56 on its upper end above the supporting disc meshing with a concentric sun gear 57. By this planetary system of gearing the beater shaft 55 is rotated in the course of its travel about the axis of the main shaft 35 and the beater is thereby rotated and at the same time carried in a circular orbit within the bowl.

Figures 2 and 3 show how different forms of beaters or whips may be mounted on the beater shaft and Figure 3 indicates in addition how when desired, the bread hook can be mounted on the fixed stem 54 which simply travels in the orbital path. These various implements may be suitably attached to the stems provided therefor, for instance, by means of the ordinary bayonet joints illustrated and comprising pins 56′ on the stems to enter bayonet slots 57′ in the collars 58 of the implements, the springs 59 on the stems exerting tension to hold the tools properly coupled. The rotating beater stem 55 is shown larger than the nonrotating hook stem 54 to prevent any possibility of the hook being engaged on the beater stem, which latter might result in injury to the apparatus.

The dependent annular flange 60 on the under side of the casing serves as a guard and cover about the planetary gears and the rotating disc which carries the implement stems.

A take-off for driving a food chopper, ice cream freezer or the like is shown provided at the front of the transmission unit in the form of a socketed shaft 61, having a bevel pinion 62 inside the casing in mesh with a bevel pinion 63 on the upright drive shaft 35. Figure 3 illustrates in broken lines how a food chopper 64 may be engaged with a socket 65 to bring the squared end of the food chopper shaft into coupled relation with the squared socket in the take-off shaft. This same take-off may be utilized in similar fashion for driving an ice cream freezer or other piece of apparatus.

Figure 5:
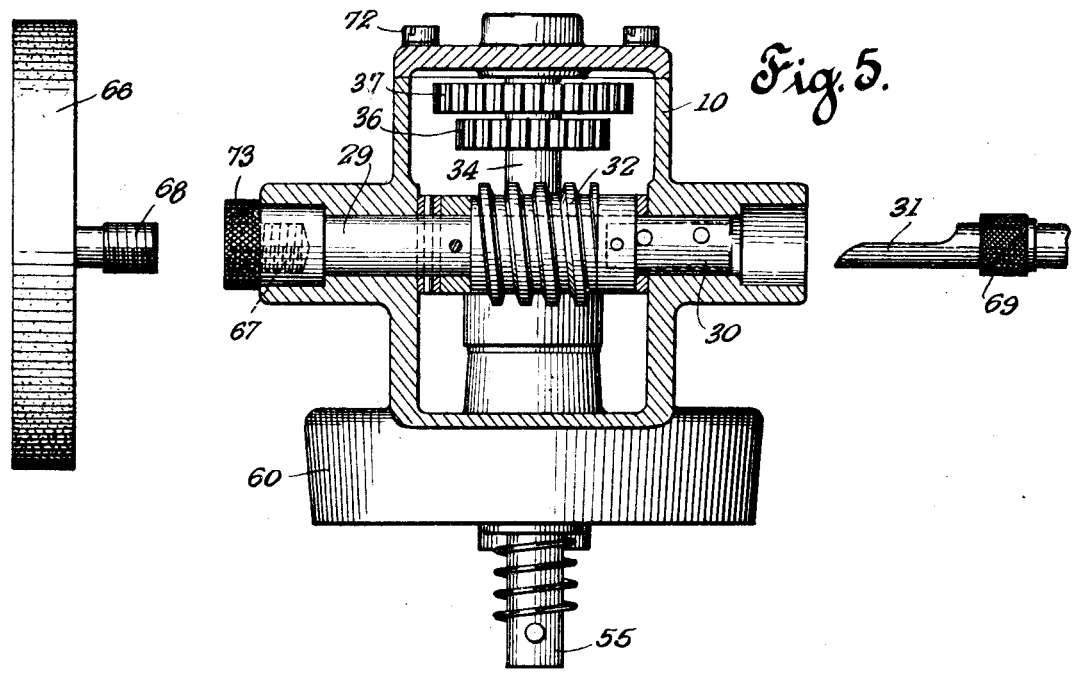
Figure 5 is a vertical sectional view as on line 5—5 of Figure 4.

Provision is made for operation of a buffer 66, grinding wheel or the like, as shown particularly in Figures 1, 2 and 5, by gripping the far end of the transverse worm shaft 29 with a screw socket 67 to receive the screw threaded end portion 68 of a stub shaft carrying the wheel or other implement. This gives a direct drive at motor speed and during such use of the machine, the clutch key will usually be shifted into the neutral position to cut out operation of the planetary gearing and front power take-off. If desired, however, all these parts may be driven at the same time. The two-speed gear control enables quick changes in speed to be made for different kinds of beater, mixing or driving relations.

In the lowered position of the bowl, the implements may be readily coupled and uncoupled and the bowl be removed and replaced. The adjustable mounting of the bowl and transmission units on the standard and the adjustable mounting of the standard on the base permit these parts to be set in the most practical and desired relations and to be readily unmounted for packing or shipping purposes. The power take-off at motor speed on the side of the transmission case and the front power take-off at reduced speed and which can be driven at either one of two selected speeds, enable the machine to be used for many useful purposes. The coupling of the transmission with the motor by flexible shafting is especially advantageous, enabling the mixer and the motor each to be separately set where most convenient and practical and permitting the motor to be readily used for other purposes when not in operation for driving the mixer.

This remote-power, flexible shaft drive has the further advantage of eliminating motor vibration at the mixer, it being possible when desired to place the motor on an entirely separate support from which no vibration can be transmitted to the rest of the apparatus. The coupling 69 between the flexible shafting and the transmission may be of the bayonet joint or other readily separable type to enable the quick connection and disconnection of the two separate units. The motor is shown equipped with a carrying handle 70 and control switch 71 as matters of convenience in the placing and control of the same. The top of the gear case is indicated as a separate cover detachably secured in place by screws 72 so that the case may be readily packed with grease or suitable lubricant for the gears and other parts.

The power take-off end of the motor driven shaft 29 is illustrated as projecting slightly from the casing and as being knurled to form a grip by which the shaft may be turned with the fingers to line up the coupling elements of the flexible drive shafting.

The invention, it will be seen, is a practical improvement upon and in effect a continuation of my prior Patent 1,707,550.

What is claimed is:

1. In apparatus of the character disclosed, the combination of a gear case and vertically arranged driving and driven shafts journaled therein, one of said shafts having a concentric bore therein open through the top of the case and provided with a keyway slot in one side of the bore, a concentrically disposed control rod entered in said bore and having a loosely rotatable finger knob on the end of the same above the top of the case by which said control rod may be shifted longitudinally in the bore of the shaft, a key carried by said control rod and projecting through the keyway slot, said key consisting of a substantially half round piece provided with a lug extending out through the keyway slot and said control rod having a substantially half round seat in the side of the same to receive the substantially half round portion of the key, which latter is thereby held in said seat by the surrounding wall of the bore in the shaft, and companion gears on the driving and driven shafts, those on the shaft with the bore therein being loose on said shaft but having keyways to receive the key carried by the control rod.

2. In apparatus of the character disclosed, the combination of a gear case and driving and driven shafts journaled therein, one of said shafts having a concentric bore therein open to the exterior of the case and provided with a keyway slot in one side of the bore, a concentrically disposed control rod entered in said bore and having an actuating handle outside the case by which said control rod may be shifted longitudinally in the bore of the shaft, a key carried by said control rod and projecting through the keyway slot and companion gears on the driving and driven shafts, those on the shaft with the bore therein being loose on said shaft but having keyways to receive the key carried by the control rod, the control rod having a substantially half-round seat in the side of the same and the key comprising a substantially half-round piece loosely set in said seat and having a lug portion extending out through the keyway slot.

3. In apparatus of the character disclosed, the combination of a gear case and driving and driven shafts journaled therein, one of said shafts having a concentric bore therein open to the exterior of the case and provided with a keyway slot in one side of the bore opening to the exterior of the case, a concentrically disposed control rod entered in said bore and having an actuating handle outside the case by which said control rod may be shifted longitudinally in the bore of the shaft, a key carried by said control rod and projecting through the keyway slot, companion gears on the driving and driven shafts, those on the shaft with the bore therein being loose on said shaft but having keyways to receive the key carried by the control rod, a collar detachably secured to the case about the projecting portion of the control rod and overstanding the open end of the keyway to thereby removably retain the key and control rod in position in the bore of the shaft and spring retaining means for the control rod carried by said collar, the handle means for the control rod comprising a finger button loosely mounted on the control rod adjacent said collar.

4. In a device of the character disclosed, a gear case, a horizontal motor driven shaft in said case, an upright implement operating shaft journaled in the case, a second upright shaft in the case actuated from the motor driven shaft, companion gears on the upright shafts, one of said upright shafts having a concentric bore in the upper end of the same opening through the top of the case, a control rod shiftable longitudinally in the bore of said shaft, clutch means operable by said control rod to control the gear drive between the upright shafts and a retainer collar removably secured to the top of the case over the bore in the shaft and removably retaining the control rod in operative relation in said bore.

5. In apparatus of the character disclosed, the combination of a gear case, parallel shafts mounted therein and one having a concentric bore in one end open to the exterior of the case and provided with a keyway slot in one side of said bore, a control rod entered in said bore and having a substantially half round seat in one side of the same, a key comprising a substantially half round piece loosely set in said seat and having a lug portion extending out through the keyway slot, an actuating handle for said control rod for shifting the same with said key piece longitudinally in the bore of the shaft and companion gears on the shafts, those on the shaft with the bore therein being loose on said shaft but having keyways to receive the key carried by the control rod.

In testimony whereof I affix my signature.

BENJAMIN GOULD.